United States Patent
Sandler et al.

(10) Patent No.: US 8,527,756 B2
(45) Date of Patent: Sep. 3, 2013

(54) SECURITY DEVICE AND BUILDING BLOCK FUNCTIONS

(75) Inventors: Leonid Sandler, Jerusalem (IL); Yaron Sella, Yehud (IL); Erez Waisbard, Or-yehuda (IL)

(73) Assignee: Cisco Technology, Inc., San Jose, CA (US)

( * ) Notice: Subject to any disclaimer, the term of this patent is extended or adjusted under 35 U.S.C. 154(b) by 1500 days.

(21) Appl. No.: 11/990,720

(22) PCT Filed: Sep. 27, 2006

(86) PCT No.: PCT/IL2006/001133
§ 371 (c)(1),
(2), (4) Date: Mar. 18, 2008

(87) PCT Pub. No.: WO2007/039896
PCT Pub. Date: Apr. 12, 2007

(65) Prior Publication Data
US 2011/0271104 A9    Nov. 3, 2011

Related U.S. Application Data

(60) Provisional application No. 60/724,342, filed on Oct. 6, 2005.

(51) Int. Cl.
*H04L 9/32* (2006.01)
(52) U.S. Cl.
USPC ............ 713/168; 713/172; 455/411; 380/200
(58) Field of Classification Search
USPC ......................................... 380/278
See application file for complete search history.

(56) References Cited

U.S. PATENT DOCUMENTS

| 5,182,770 | A | 1/1993 | Medveczky et al. |
| 5,857,025 | A | 1/1999 | Anderson et al. |
| 6,088,450 | A | 7/2000 | Davis et al. |
| 6,598,161 | B1 * | 7/2003 | Kluttz et al. ................. 713/166 |
| 6,598,163 | B1 | 7/2003 | Jakobsson |
| 6,694,436 | B1 * | 2/2004 | Audebert ......................... 726/9 |

(Continued)

FOREIGN PATENT DOCUMENTS

| JP | 2000-295212 | 10/2000 |
| WO | WO 03/024138 A1 | 3/2003 |
| WO | WO 2005/031593 A1 | 4/2005 |

OTHER PUBLICATIONS

Dianelos Georgoudis, "The 'FROG' Encryption Algorithm", (TecApro Intl., South Africa, Jun. 1998).

(Continued)

*Primary Examiner* — Ashok Patel
*Assistant Examiner* — Gary Gracia
(74) *Attorney, Agent, or Firm* — Husch Blackwell LLP (57) ABSTRACT

A method and system of securing content is described, the method including establishing communication between a secure module source and a content rendering device, loading a dynamically generated pseudo-unique secure module to the content rendering device from the secure module source, establishing communication between the secure module source and the dynamically generated pseudo-unique secure module, and transferring a decryption key from the secure module source to the dynamically generated pseudo-unique secure module, thereby enabling decryption of encrypted content, the encrypted content being encrypted according to the decryption key. Related methods and apparatus are also described.

35 Claims, 4 Drawing Sheets

(56) References Cited

U.S. PATENT DOCUMENTS

| | | | |
|---|---|---|---|
| 6,813,354 B1 | 11/2004 | Jakobsson et al. | |
| 6,845,159 B1 | 1/2005 | Dömstedt et al. | |
| 7,124,938 B1* | 10/2006 | Marsh | 235/382 |
| 7,245,819 B1* | 7/2007 | Sanders | 386/241 |
| 7,430,670 B1* | 9/2008 | Horning et al. | 713/190 |
| 2003/0123665 A1* | 7/2003 | Dunstan et al. | 380/255 |
| 2003/0135730 A1* | 7/2003 | Szucs et al. | 713/153 |
| 2003/0177381 A1* | 9/2003 | Ofek et al. | 713/200 |
| 2003/0223582 A1* | 12/2003 | Dagan | 380/210 |
| 2004/0022271 A1* | 2/2004 | Fichet et al. | 370/486 |
| 2004/0026502 A1* | 2/2004 | Tame | 235/382 |
| 2004/0068541 A1* | 4/2004 | Bayassi et al. | 709/204 |
| 2004/0083380 A1* | 4/2004 | Janke | 713/194 |
| 2004/0168063 A1* | 8/2004 | Revital et al. | 713/172 |
| 2004/0220985 A1* | 11/2004 | Morris | 708/250 |
| 2004/0230797 A1* | 11/2004 | Ofek et al. | 713/168 |
| 2004/0237100 A1* | 11/2004 | Pinder et al. | 725/31 |
| 2005/0037735 A1* | 2/2005 | Coutts | 455/411 |
| 2005/0041955 A1* | 2/2005 | Beuque | 386/94 |
| 2005/0060525 A1* | 3/2005 | Schwartz et al. | 713/1 |
| 2005/0131832 A1* | 6/2005 | Fransdonk | 705/59 |
| 2005/0132207 A1 | 6/2005 | Mourad | |
| 2005/0185647 A1* | 8/2005 | Rao et al. | 370/392 |
| 2005/0193191 A1* | 9/2005 | Sturgis | 713/155 |
| 2005/0232416 A1* | 10/2005 | Sonnekalb et al. | 380/46 |
| 2005/0273613 A1* | 12/2005 | Dellmark et al. | 713/176 |
| 2006/0026688 A1* | 2/2006 | Shah | 726/25 |
| 2006/0090209 A1* | 4/2006 | Garay et al. | 726/26 |
| 2006/0109101 A1* | 5/2006 | Genda et al. | 340/521 |
| 2006/0184796 A1* | 8/2006 | Fahrny | 713/176 |
| 2006/0200410 A1* | 9/2006 | Kelley et al. | 705/43 |
| 2006/0205516 A1* | 9/2006 | Yeend et al. | 463/43 |
| 2006/0230102 A1* | 10/2006 | Hidary | 709/203 |
| 2006/0294312 A1* | 12/2006 | Walmsley | 711/122 |
| 2007/0220500 A1* | 9/2007 | Saunier | 717/162 |
| 2007/0242039 A1* | 10/2007 | Chen et al. | 345/157 |

OTHER PUBLICATIONS

Feb. 11, 2010 Office Communication in connection with AU 2006 298420 (2 pgs.).

Jun. 11, 2010 Office Communication in connection with prosecution of CN 2006 800 36934.4 (w/English translation).

Bruce Schneier, *Applied Cryptography, Protocols, Algorithms and Source Code in C* (2d ed, p. 3) (John Wiley & Sons, 1996).

Aug. 24, 2011 Office Communication in connection with prosecution of CN 2006 8003 6934.4.

Feb. 8, 2013 Office Communication in connection with prosecution of EP 06 79 6130.0.

\* cited by examiner

SECURITY DEVICE AND BUILDING BLOCK FUNCTIONS

RELATED APPLICATION INFORMATION

The present application is a 35 USC §371 application of PCT/IL2006/001133, filed on 27 Sep. 2006 and entitled "Security Device and Building Block Functions", which was published in the English language with International Publication Number WO 2007/039896, and which claims the benefit of priority based on U.S. Provisional Patent Application Ser. No. 60/724,342, filed 6 Oct. 2005, entitled, "Security Device and Building Block Functions".

FIELD OF THE INVENTION

The present invention relates to securing content on a computer, and more particularly, to securing content on a computer using a security device, such as a dongle or a smart card.

BACKGROUND OF THE INVENTION

U.S. Pat. No. 5,182,770 to Medveczky, et al., describes an integrated software piracy prevention system incorporating several characteristic identification codes identifying installation and software components. A separate security device is attached to and in communication with the protected computer system. It is interactively queried regarding proper authorization of the current user. This approach provides economical tracking of licensees and their use of sophisticated programs.

U.S. Pat. No. 5,857,025 to Anderson, et al., describes using a device and method using a split processor based architecture to provide physical security of critical information by implementing a required protocol before releasing critical information. The critical information is used as a key to a cryptographic algorithm. A chaotic cryptographic algorithm is also provided including a defined key space employing six parameters of a Lorenzian system of equations.

U.S. Pat. No. 6,088,450 to Davis, et al., describes a wireless authentication system to control an operating state of a node being a computer, door control mechanism or any multi-state product based on the proximity of an authorized user to the node. The wireless authentication system comprises a security device implemented within the computer and a user authentication token ("token") in possession of the authorized user. A Challenge/Response protocol is configured between the security device and the token. The first successful Challenge/Response message exchange between the security device and the token places the node in an operational state allowing the authorized user access to the contents and/or networked resources of the node. Later Challenge/Response message exchanges are set to occur periodically to check whether the authorized user possessing the token has left the node unattended thereby causing the node to be placed in a non-operational state.

The FROG block cipher (see tecapro.com/aesfrog.html) is a block cipher which hides the exact sequence of primitive operations even though the cipher itself is known. When other ciphers use the secret key only as data (which are combined with the plaintext to produce the ciphertext) FROG uses the key both as data and as instructions on how to combine these data. In effect an expanded version of the key is used by FROG as a program. FROG itself operates as an interpreter that applies this key-dependent program on the plaintext to produce the ciphertext.

The disclosures of all references mentioned above and throughout the present specification, as well as the disclosures of all references mentioned in those references, are hereby incorporated herein by reference.

SUMMARY OF THE INVENTION

The present invention seeks to provide an improved method and system of using a security device, such as a dongle or smart card, in order to secure content consumption on a general purpose computer or other content rendering device.

The term "render", as in "content rendering device", in all of its grammatical forms, as used herein in the present specification and claims, is understood to refer to any appropriate mechanism or method of making content palpable to one or more of the senses. In particular and without limiting the generality of the foregoing, "render" refers not only to display of video content but also to playback of audio content.

There is thus provided in accordance with a preferred embodiment of the present invention a method of securing content, the method including establishing communication between a secure module source and a content rendering device, loading a dynamically generated pseudo-unique secure module to the content rendering device from the secure module source, establishing communication between the secure module source and the dynamically generated pseudo-unique secure module, and transferring a decryption key from the secure module source to the dynamically generated pseudo-unique secure module, thereby enabling decryption of encrypted content, the encrypted content being encrypted according to the decryption key.

Further in accordance with a preferred embodiment of the present invention the secure module source includes a security device.

Still further in accordance with a preferred embodiment of the present invention the secure module source includes a remote server.

Additionally in accordance with a preferred embodiment of the present invention the method includes establishing a first secure authenticated channel for secure communication between the secure module source and the content rendering device.

Moreover in accordance with a preferred embodiment of the present invention the method includes establishing a second secure authenticated channel for secure communication between the secure module source and the dynamically generated pseudo-unique secure module.

Further in accordance with a preferred embodiment of the present invention the content rendering device also includes a secure software agent.

Still further in accordance with a preferred embodiment of the present invention the establishing the first secure authenticated channel includes establishing the first secure authenticated channel between the secure module source and the secure software agent.

Additionally in accordance with a preferred embodiment of the present invention the content rendering device includes a general purpose computer.

Moreover in accordance with a preferred embodiment of the present invention the content rendering device includes a set top box (STB).

Further in accordance with a preferred embodiment of the present invention the content rendering device includes a digital video recorder (DVR).

Still further in accordance with a preferred embodiment of the present invention the content rendering device includes a DVD player.

Additionally in accordance with a preferred embodiment of the present invention the dynamically generated pseudo-unique secure module includes a sequence of software primitives, each one of the sequence of software primitives being capable of being sequentially executed, and an output from a first one of the plurality of software primitives includes an input to a second one of the plurality of software primitives.

Moreover in accordance with a preferred embodiment of the present invention the dynamically generated pseudo-unique secure module is produced by providing a plurality of software primitives to the secure module source, and combining a sequence of software primitives from among the plurality of software primitives in order to form the dynamically generated pseudo-unique secure module, wherein each software primitive from among the plurality of software primitives includes a software primitive which can be sequentially executed, and an output from a first one of the plurality of software primitives includes an input to a second one of the plurality of software primitives.

There is also provided in accordance with another preferred embodiment of the present invention a method of securing content, the method including establishing communication between a secure module source and a content rendering device, loading a dynamically generated pseudo-unique secure module to the content rendering device from the secure module source, establishing communication between the secure module source and the dynamically generated pseudo-unique secure module, and transferring a decryption key from the secure module source to the dynamically generated pseudo-unique secure module, thereby enabling decryption of encrypted content, the encrypted content being encrypted according to the decryption key, wherein the dynamically generated pseudo-unique secure module includes a sequence of software primitives, each one of the sequence of software primitives being capable of being sequentially executed, and an output from a first one of the plurality of software primitives includes an input to a second one of the plurality of software primitives.

Further in accordance with a preferred embodiment of the present invention the dynamically generated pseudo-unique secure module is produced by providing a plurality of software primitives to the secure module source, and combining a sequence of software primitives from among the plurality of software primitives in order to form the dynamically generated pseudo-unique secure module, wherein each software primitive includes a software primitive which can be sequentially executed, and an output from a first one of the plurality of software primitives includes an input to a second one of the plurality of software primitives.

There is also provided in accordance with still another preferred embodiment of the present invention a method of constructing a dynamically generated pseudo-unique secure module, the method including providing a plurality of software primitives to a secure module source, and combining a sequence of software primitives from among the plurality of software primitives in order to form a secure module, wherein each software primitive includes a software primitive which can be sequentially executed, and an output from a first one of the plurality of software primitives includes an input to a second one of the plurality of software primitives.

Further in accordance with a preferred embodiment of the present invention the method includes receiving an initial input, inputting the initial input to the first one of the plurality of software primitives, sequentially inputting the output from a prior one of the plurality of software primitives to a next one of the plurality of software primitives until a final one of the plurality of software primitives produces a final output, and outputting the final output.

Still further in accordance with a preferred embodiment of the present invention the secure module produces a result based, at least in part, on the initial input.

Additionally in accordance with a preferred embodiment of the present invention the result is also based, at least in part, on an order of the plurality of software primitives.

Moreover in accordance with a preferred embodiment of the present invention at least one of the software primitives includes a hash function.

Further in accordance with a preferred embodiment of the present invention all of the software primitives including the plurality of software primitives must be used in order to form the secure module.

Still further in accordance with a preferred embodiment of the present invention each one of the plurality of software primitives must be used once and only once in order to form the secure module.

Additionally in accordance with a preferred embodiment of the present invention each one of the plurality of software primitives may be used more than once in order to form the secure module.

Moreover in accordance with a preferred embodiment of the present invention any subset of the software primitives including the plurality of software primitives may be used in order to form the secure module.

Further in accordance with a preferred embodiment of the present invention a minimum number of the software primitives including the plurality of software primitives are used in order to form the secure module.

Still further in accordance with a preferred embodiment of the present invention the secure module is operative to decrypt an encrypted message.

Additionally in accordance with a preferred embodiment of the present invention the encrypted message includes content.

Moreover in accordance with a preferred embodiment of the present invention the secure module source includes a security device.

Further in accordance with a preferred embodiment of the present invention the secure module source includes a remote server.

There is also provided in accordance with still another preferred embodiment of the present invention an apparatus for securing content, the apparatus including a first communication mechanism operative to establish communication between a secure module source and a content rendering device, a dynamically generated pseudo-unique secure module loader operative to load a dynamically generated pseudo-unique secure module to the content rendering device from the secure module source, a second communication mechanism operative to establish communication between the secure module source and the dynamically generated pseudo-unique secure module, and a decryption key transferring mechanism operative to transfer a decryption key from the secure module source to the dynamically generated pseudo-unique secure module, thereby enabling decryption of encrypted content, the encrypted content being encrypted according to the decryption key.

There is also provided in accordance with still another preferred embodiment of the present invention an apparatus for securing content, the apparatus including a first communication mechanism operative to establish communication between a secure module source and a content rendering device, a dynamically generated pseudo-unique secure module loader operative to load a dynamically generated pseudo-unique secure module to the content rendering device from the secure module source, a second communication mechanism operative to establish communication between the secure module source and the dynamically generated pseudo-unique secure module, and a decryption key transferring mechanism operative to transfer a decryption key from the secure module source to the dynamically generated pseudo-unique secure module, thereby enabling decryption of encrypted content, the encrypted content being encrypted according to the decryption key, wherein the dynamically generated pseudo-unique secure module includes a sequence of software primitives, each one of the sequence of software primitives being capable of being sequentially executed, and an output from a first one of the plurality of software primitives includes an input to a second one of the plurality of software primitives.

There is also provided in accordance with still another preferred embodiment of the present invention a system for constructing a dynamically generated pseudo-unique secure module, the system including a plurality of software primitives included at a secure module source, and a combiner for combining a sequence of software primitives from among the plurality of software primitives in order to form a secure module, wherein each software primitive from plurality of software primitives among the includes a software primitive which can be sequentially executed, and an output from a first one of the plurality of software primitives includes an input to a second one of the plurality of software primitives.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
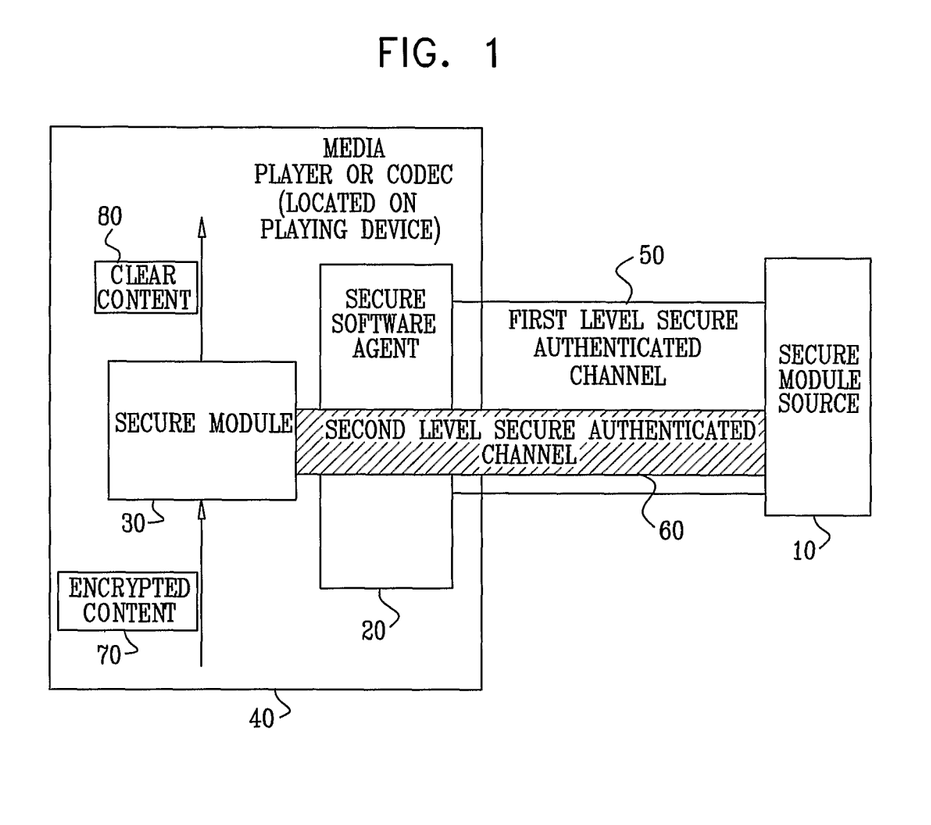
FIG. 1 is a simplified block diagram illustration of a security system constructed and operative in accordance with a preferred embodiment of the present invention.

Reference is now made to FIG. 1, which is a simplified block diagram illustration of a security system constructed and operative in accordance with a preferred embodiment of the present invention. The system of FIG. 1 comprises a secure module source 10, a secure software agent 20, and a secure module 30.

The secure module 30 preferably comprises a dynamically generated pseudo-unique software module which is dynamically loaded or appended by the secure software agent 20 at run time. For example and without limiting the generality of the foregoing, the secure module 30 preferably comprises an operation system independent and execution location independent code fragment.

The secure module 30 is preferably sent by the secure module source 10 to a secure software agent 20 comprised in a general purpose computer or other content rendering device 40. In some preferred embodiments of the present invention, the secure module source 10 preferably comprises a security device. For example and without limiting the generality of the foregoing, the secure device may comprise a dongle, as is known in the art.

In alternative preferred embodiments of the present invention, the secure module source 10 preferably comprises a remote server. For example and without limiting the generality of the foregoing, the remote server may comprise a broadcast headend or a content provider. If the secure module source 10 is connected to the remote server, the secure module source 10 preferably communicates with the content rendering device 40 over a LAN or a global network, such as, but not limited to, the Internet.

Non-limiting examples of a content rendering device include such devices as a general purpose computer, a set top box (STB), a digital video recorder (DVR), and a DVD player. The secure software agent 20 is operatively associated with "media player"-like software, or, in some preferred embodiments, a codec of the "media player"-like software comprised on the computer or content rendering device.

Those skilled in the art will appreciate that, in general, key distribution typically preferably occurs between security devices or secure servers. The present invention, in preferred embodiments thereof, preferably enables a method of transfer of content encryption keys from the secure module source 10 to the content rendering device 40.

It is further appreciated that a software application designed to play content on the content rendering device 40 may preferably comprise a software application. In such a case, upon arrival of the secure module 30 from the secure module source 10, the secure module 30 then enables the software application, enabling use of the content rendering device 40.

A preferred method of forming the secure module 30 is now described. The secure module 30 preferably comprises a pseudo-unique security function. The pseudo-unique security function is preferably constructed utilizing a plurality of software primitives available to the secure module source 10. Each primitive of the plurality of software primitives is preferably capable of being combined with any other of the plurality of software primitives. For example and without limiting the generality of the foregoing, each primitive can be executed sequentially. A subset or sequence of the plurality of primitives is preferably combined in a random or pseudo-random fashion in order to comprise the secure module 30. For example and without limiting the generality of the foregoing, each primitive of the plurality of software primitives may comprise a well known hash function with a specific initial value.

The software primitives can be used in any order at all and may be repeated. For example, if there are five software primitives, A, B, C, D, and E, and up to five software primitives must be combined in order to comprise the secure module 30, and not all of the primitives need to be used, the secure module 30 may comprise, for instance:

ACDBE;

D;

AEA; and

EBAAC.

It is appreciated that combining individual primitives from among the plurality of software primitives as described herein can produce a very large number of combinations of primitives. For example and without limiting the generality of the foregoing, if there are 32 primitives available to the security device, and each one of the 32 primitives should be used once and only once, and the order the 32 primitives are used in does not matter, there are 32! possible combinations of primitives.

In some embodiments of the present invention, some of the plurality of software primitives available to, and stored on, the secure module source 10 are preferably encrypted, while others of the plurality of software primitives available to the secure module source 10 are preferably not encrypted. The encrypted primitives are preferably encrypted using different encryption keys, and are either encrypted in such a fashion that the encryption keys are preferably not available to the secure module source 10 itself, but are preferably stored at a central authority, such as a broadcast headend. Alternatively, the encrypted software primitives are preferably locally encrypted. Thus, in the event of a reverse engineering attack on the security device, it will preferably be very difficult to discover a full set of the software primitives. In some preferred embodiments of the present invention, when the secure module source 10 needs to assemble a secure module 30 to be sent to the secure software agent 20, the secure module source 10 preferably receives all the required decryption keys from the central authority. In the event that the secure module source 10 receives all of the required decryption keys from the central authority, the secure module source 10 preferably uses the decrypted primitives for secure module 30 construction. If, for some reason, no decryption key is available, the secure module source 10 preferably uses only unencrypted primitives for secure module 30 construction. It is appreciated that the required decryption keys are preferably securely delivered from the central authority under the protection of an appropriate secure delivery scheme, such as a conditional access system.

It is appreciated that the secure module 30 is preferably able to perform other security functions in addition to content decryption, as described above. For example and without limiting the generality of the foregoing, in addition to content decryption, the secure module 30 is preferably also able to perform at least: key management and calculation; content decoding; and license enforcement.

The secure module source 10 preferably episodically shuffles the plurality of software primitives such that software primitives that were once encrypted become non-encrypted, and software primitives which were non-encrypted become encrypted using the same key provided by the central authority.

It is also appreciated that certain individual primitives among the plurality of software primitives may preferably comprise functions producing the same result, but comprising different programming code, and thus comprising different programming code patterns (also known in the art as "code signatures").

The secure module 30, when sent to the content rendering device 40, will preferably communicate with the secure module source 10, and negotiate for a delivery of the content encryption key. The secure module 30 also preferably comprises executable computer code operative to decrypt encrypted content. The secure module 30 still further preferably comprises content access business rules, for example and without limiting the generality of the foregoing, a content expiration date, after which the content may no longer be consumed. An executable portion of the secure module 30 will therefore preferably be different, or pseudo-unique, for each content encryption key transfer. Therefore, it is necessary to intercept or steal and reverse engineer each individual secure module 30 for each individual content key.

In order to complicate any attempts at reverse engineering the security module 30, the secure module source 10 preferably allows a limited time window for the secure module 30 to run. The secure module source 10 preferably limits response time by running an internal timer. It is appreciated that the internal timer preferably comprises a secure timer. The secure module 30 must prove to the secure module source 10 that the secure module 30 has finished running, preferably by presenting a result of a calculation to the secure module source 10 before the termination of the limited time window. In the event that the secure module 30 fails to present the result of the calculation to the secure module source 10 before the termination of the limited time window, the secure module source 10 will not return the encryption key.

Returning to the discussion of FIG. 1, in a first stage of communication between the secure module source 10 and the content rendering device 40, a first level secure authenticated channel (SAC) 50 is preferably established between the secure software agent 20 and the secure module source 10. Then, via the first level SAC 50, the secure module 30, comprising the pseudo-unique security function is uploaded from the secure module source 10 to the content rendering device 40.

In a second stage of communication between the secure module source 10 and the content rendering device 40, a second level SAC 60 is preferably established between the secure module 30 comprised in the content rendering device 40 and the secure module source 10, using the pseudo-unique security function as described herein.

Those skilled in the art will appreciate that the secure module source 10 preferably constructs, for its own use, exactly the same pseudo-unique security function as the content rendering device 40 is using in the secure module 30, in order to enable the secure module source 10 to properly communicate with the secure module 30.

After the second level SAC 60 is established between the secure module source 10 and the secure module 30, the secure module source 10 preferably is able to provide at least one content decryption key to the secure module 30. The secure module 30 preferably either performs or controls decryption of content.

Figure 2:
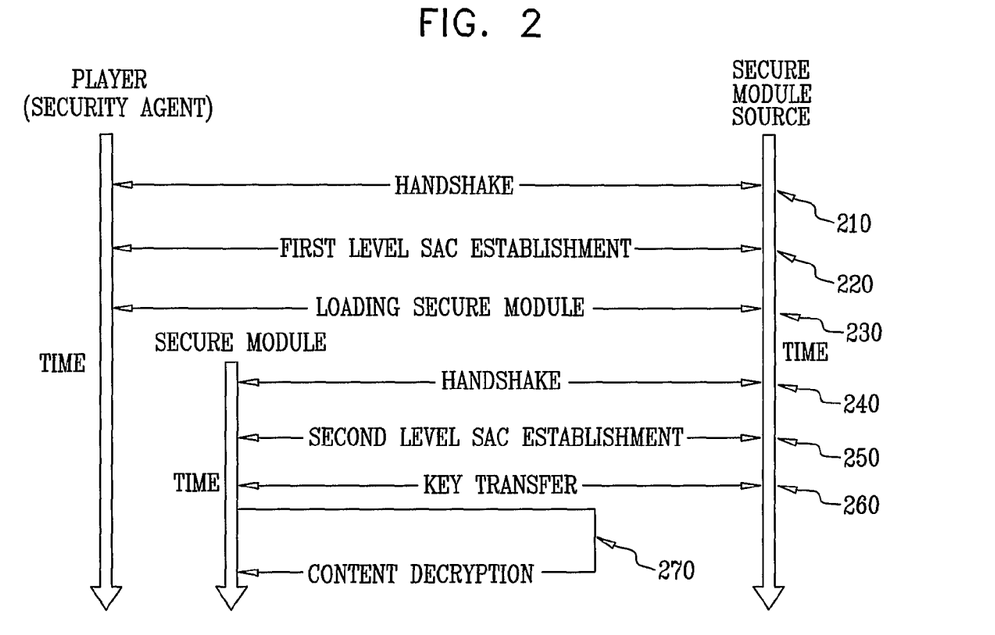
FIG. 2 is a simplified illustration diagramming communication between the secure module source and a content rendering device of FIG. 1.

Reference is now additionally made to FIG. 2, which is a simplified illustration diagramming communication between the secure module source 10 and a content rendering device 40 of FIG. 1.

In a first stage of communication between the secure module source 10 and the content rendering device 40, a communication handshake preferably takes place (step 210). Specifically, the secure module source 10 establishes communication with the secure software agent 20 comprised in the content rendering device 40. Upon completion of the handshake, the first level SAC 50 is established between the secure module source 10 and the secure software agent 20 (step 220). Once the first level SAC 50 is established, the secure module 30 is uploaded from the secure module source 10 to the content rendering device 40 (step 230).

Once the secure module 30 is uploaded from the secure module source 10 to the content rendering device 40, the secure module source 10 communicates directly with the secure module 30. During the first stage of communication between the secure module source 10 and the secure module 30, a communication handshake preferably takes place (step 240). Upon completion of the handshake, the second level SAC 60 is preferably established between the secure module source 10 and the secure module 30 (step 250). The secure module source 10 preferably securely transfers the least one content decryption key to the secure module 30 (step 260). Upon receipt of the at least one content decryption key by the secure module 30, the secure module 30 is preferably able to decrypt encrypted content 70 (step 270), thereby producing clear content 80, for rendering by the content rendering device 40.

Figure 3:
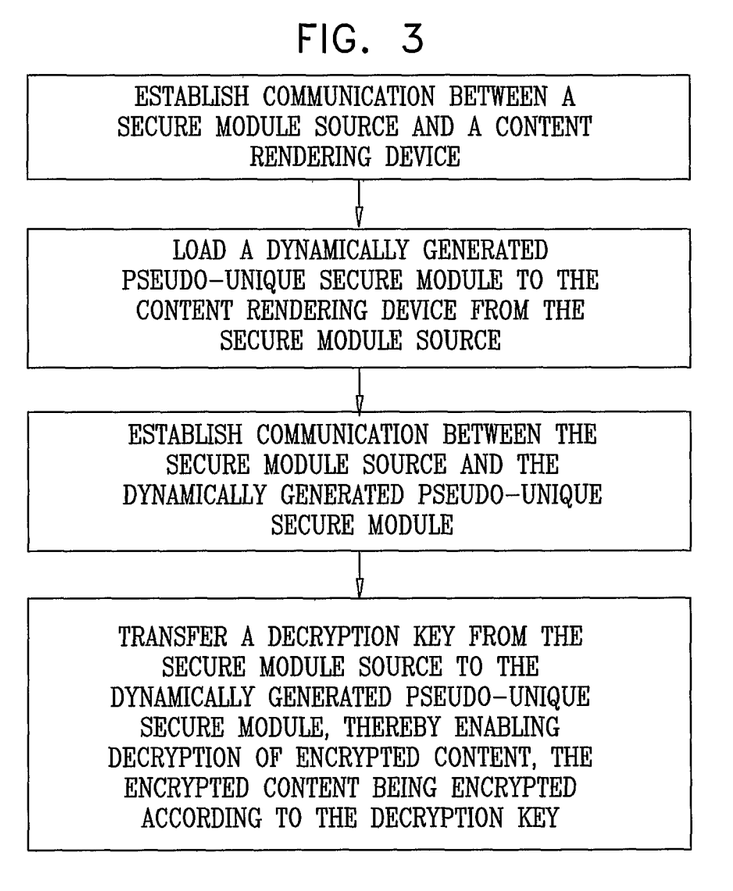
FIGS. 3-5 are simplified flowchart diagrams of preferred methods of operation of the system of FIG. 1.
Figure 4:
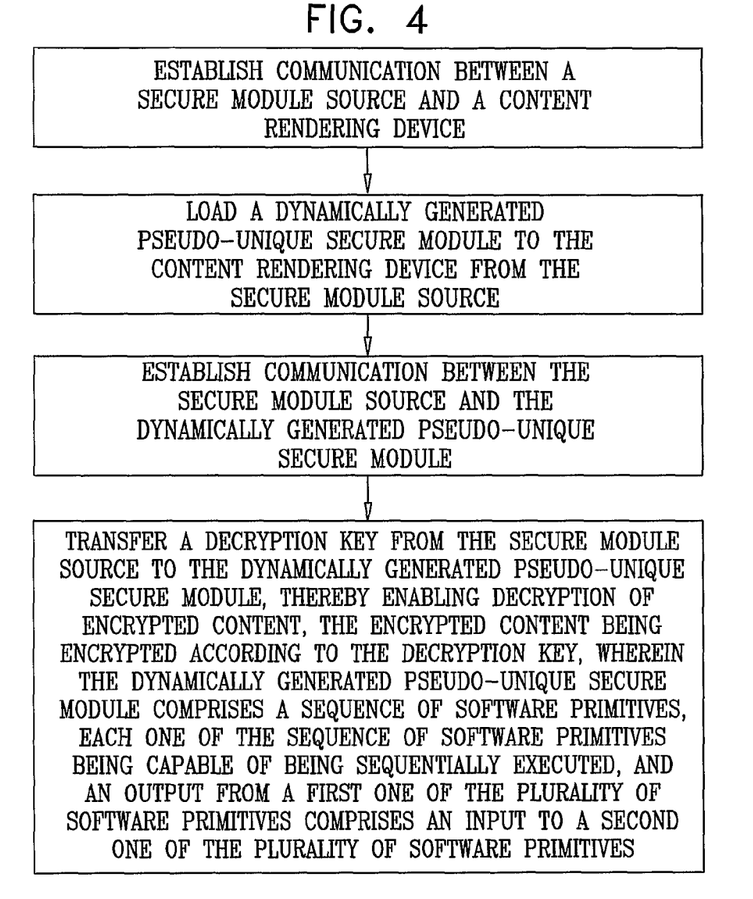
Figure 5:
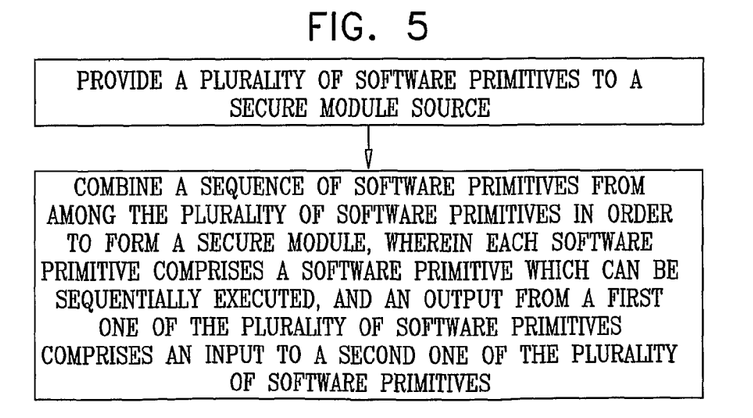

FIGS. 3-5 are simplified flowchart diagrams of preferred methods of operation of the system of FIG. 1. The methods of FIGS. 3-5 are believed to be self explanatory in light of the above discussion.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

The invention claimed is:

1. A method of securing content, the method comprising:
   establishing communication between a secure module source and a content rendering device;
   producing a dynamically generated pseudo-unique secure module by:
   providing a plurality of available individual software primitives to the secure module source; and
   combining a sequence of software primitives from among the plurality of available individual software primitives, where the sequence may combine any of the available individual software primitives in any order at all, where any of the available individual software primitives may be repeated in the sequence, and where the sequence does not have to include all of the available individual software primitives, so that the sequence thereby can be any one of a large number of possible combinations of the available individual software primitives;
   loading the dynamically generated pseudo-unique secure module to the content rendering device from the secure module source, the dynamically generated pseudo-unique secure module comprising the sequence of software primitives;
   after the loading step, establishing communication between the secure module source and the dynamically generated pseudo-unique secure module; and
   after the step of establishing communication between the secure module source and the dynamically generated pseudo-unique secure module, transferring a decryption key from the secure module source to the dynamically generated pseudo-unique secure module, thereby enabling decryption of encrypted content, the encrypted content being encrypted according to the decryption key,
   wherein each one of the sequence of software primitives is sequentially executed, and an output from a first one of the sequence comprises an input to a second one of the sequence.

2. The method according to claim 1 and wherein the secure module source comprises a security device.

3. The method according to claim 1 and wherein the secure module source comprises a remote server.

4. The method according to claim 1 and also comprising establishing a first secure authenticated channel for secure communication between the secure module source and the content rendering device.

5. The method according to claim 4 and wherein the content rendering device also comprises a secure software agent.

6. The method according to claim 5 and wherein the establishing the first secure authenticated channel comprises establishing the first secure authenticated channel between the secure module source and the secure software agent.

7. The method according to claim 1 and also comprising establishing a second secure authenticated channel for secure communication between the secure module source and the dynamically generated pseudo-unique secure module.

8. The method according to claim 1 and wherein the content rendering device comprises a general purpose computer.

9. The method according to claim 1 and wherein the content rendering device comprises a set top box (STB).

10. The method according to claim 1 and wherein the content rendering device comprises a digital video recorder (DVR).

11. The method according to claim 1 and wherein the content rendering device comprises a DVD player.

12. The method according to claim 1 and further comprising:
   inputting an initial input to the first one of the sequence; and
   sequentially inputting an output from a prior one of the sequence to a next one of the sequence until a final one of the sequence produces a final output.

13. The method according to claim 1 and wherein the dynamically generated pseudo-unique secure module produces a result based, at least in part, on an initial input.

14. The method according to claim 13 and wherein the result is also based, at least in part, on an order of the plurality of the software primitives within the sequence.

15. The method according to claim 1 and wherein at least one of the software primitives comprises a hash function.

16. The method according to claim 1, wherein the dynamically generated pseudo-unique secure module is able to perform content decryption, key management and calculation, content decoding, and license enforcement.

17. The method according to claim 1, wherein the dynamically generated pseudo-unique secure module comprises a content access business rule.

18. The method according to claim 1, wherein the dynamically generated pseudo-unique secure module comprises a content expiration date, after which content may no longer be consumed.

19. The method according to claim 1, further comprising:
   after the step of establishing communication between the secure module source and the dynamically generated pseudo-unique secure module, transmitting a result of a calculation from the dynamically generated pseudo-unique secure module to the secure module source;
   wherein the transferring step is performed only if the result of the calculation is transmitted to the secure module source before termination of a limited time window.

20. The method according to claim 1 wherein some of the software primitives are stored encrypted at the secure module source, and some of the software primitives are stored not encrypted.

21. The method according to claim 20 wherein at least one of the software primitives which are stored encrypted at the secure module source are encrypted according to a first encryption key and at least a second one of the software primitives which are stored encrypted at the secure module source are encrypted according to a second encryption key.

22. Apparatus for securing content, the apparatus comprising:

a dynamically generated pseudo-unique secure module loader operative to load a dynamically generated pseudo-unique secure module to a content rendering device from a secure module source, the dynamically generated pseudo-unique secure module comprising a sequence of software primitives from among a plurality of available individual software primitives, where the sequence may combine any of the available individual software primitives in any order at all, where any of the available individual software primitives may be repeated in the sequence, and where the sequence does not have to include all of the available individual software primitives, so that the sequence thereby can be any one of a large number of possible combinations of the available individual software primitives;

a communication mechanism operative (a) to establish communication between the secure module source and the content rendering device, and (b) to establish communication between the secure module source and the dynamically generated pseudo-unique secure module after the dynamically generated pseudo-unique secure module has been loaded to the content rendering device from the secure module source; and a decryption key transferring mechanism operative to transfer a decryption key from the secure module source to the dynamically generated pseudo-unique secure module after the dynamically generated pseudo-unique secure module has been loaded to the content rendering device from the secure module source, thereby enabling decryption of encrypted content, the encrypted content being encrypted according to the decryption key, wherein the dynamically generated pseudo-unique secure module comprises the sequence of software primitives, each one of the sequence of software primitives being capable of being sequentially executed, and an output from a first one of the sequence comprises an input to a second one of the sequence.

23. Apparatus for securing content, the apparatus comprising:

means for loading a dynamically generated pseudo-unique secure module to a content rendering device from a secure module source, the dynamically generated pseudo-unique secure module comprising a sequence of software primitives from among a plurality of available individual software primitives, where the sequence may combine any of the available individual software primitives in any order at all, where any of the available individual software primitives may be repeated in the sequence, and where the sequence does not have to include all of the available individual software primitives, so that the sequence thereby can be any one of a large number of possible combinations of the available individual software primitives;

a communication means (a) for establishing communication between the secure module source and the content rendering device, and (b) for establishing communication between the secure module source and the dynamically generated pseudo-unique secure module after the dynamically generated pseudo-unique secure module has been loaded to the content rendering device from the secure module source; and means for transferring a decryption key from the secure module source to the dynamically generated pseudo-unique secure module after the dynamically generated pseudo-unique secure module has been loaded to the content rendering device from the secure module source, thereby enabling decryption of encrypted content, the encrypted content being encrypted according to the decryption key, wherein each one of the sequence of software primitives is sequentially executed, and an output from a first one of the sequence comprises an input to a second one of the sequence.

24. A method of securing content, the method comprising:

establishing communication between a secure module source and a content rendering device;

loading a dynamically generated pseudo-unique secure module to the content rendering device from the secure module source, the dynamically generated pseudo-unique secure module comprising a sequence of software primitives from among a plurality of available individual software primitives, where the sequence may combine any of the available individual software primitives in any order at all, where any of the available individual software primitives may be repeated in the sequence, and where the sequence does not have to include all of the available individual software primitives, so that the sequence thereby can be any one of a large number of possible combinations of the available individual software primitives;

after the loading step, establishing communication between the secure module source and the dynamically generated pseudo-unique secure module; and after the step of establishing communication between the secure module source and the dynamically generated pseudo-unique secure module, transferring a decryption key from the secure module source to the dynamically generated pseudo-unique secure module, thereby enabling decryption of encrypted content, the encrypted content being encrypted according to the decryption key;

wherein each one of the sequence of the software primitives can be sequentially executed, and an output from a first one of the sequence comprises an input to a second one of the sequence.

25. The method according to claim 24 and further comprising:

inputting an initial input to the first one of the sequence; and sequentially inputting an output from a prior one of the sequence to a next one of the sequence until a final one of the sequence produces a final output.

26. The method according to claim 25 and wherein the dynamically generated pseudo-unique secure module produces a result based, at least in part, on the initial input.

27. The method according to claim 26 and wherein the result is also based, at least in part, on an order of the plurality of the software primitives.

28. The method according to claim 24 and wherein at least one of the software primitives comprises a hash function.

29. The method according to claim 24 and wherein all of the available software primitives comprising the plurality of the available software primitives must be used in order to form the dynamically generated pseudo-unique secure module.

30. The method according to claim 29 and wherein each one of the plurality of the available software primitives must be used once and only once in order to form the dynamically generated pseudo-unique secure module.

31. The method according to claim 29 and wherein each one of the plurality of the available software primitives may be used more than once in order to form the dynamically generated pseudo-unique secure module.

32. The method according to claim 24 and wherein a minimum number of the available software primitives comprising the plurality of the available software primitives are used in order to form the dynamically generated pseudo-unique secure module.

33. The method according to claim 24 and wherein the secure module source comprises a security device.

34. The method according to claim 24 and wherein the secure module source comprises a remote server.

35. The method according to claim 24, wherein one individual primitive among the plurality of the available software primitives comprises different programming code than another individual primitive among the plurality of the available sol, ware primitives comprises, but each of said one and said other individual primitives comprises a function producing the same result.

\* \* \* \* \*

UNITED STATES PATENT AND TRADEMARK OFFICE
CERTIFICATE OF CORRECTION

| | | |
|---|---|---|
| PATENT NO. | : 8,527,756 B2 | Page 1 of 1 |
| APPLICATION NO. | : 11/990720 | |
| DATED | : September 3, 2013 | |
| INVENTOR(S) | : Sandler et al. | |

It is certified that error appears in the above-identified patent and that said Letters Patent is hereby corrected as shown below:

In the Claims

In column 13, line 16 (fifth line of claim 35), delete "sol, ware" and substitute therefor --software--.

Signed and Sealed this
Fifth Day of November, 2013

Teresa Stanek Rea
*Deputy Director of the United States Patent and Trademark Office*